US012784177B2

(12) United States Patent
Takemoto et al.

(10) Patent No.: US 12,784,177 B2
(45) Date of Patent: Nov. 3, 2026

(54) DEVICE AND METHOD FOR DETECTING DEFECT IN CORRUGATED CARDBOARD SHEET, DEVICE FOR ELIMINATING DEFECT IN CORRUGATED CARDBOARD SHEET, AND DEVICE FOR MANUFACTURING CORRUGATED CARDBOARD SHEET

(71) Applicant: MITSUBISHI HEAVY INDUSTRIES MACHINERY SYSTEMS, LTD., Hyogo (JP)

(72) Inventors: Shuichi Takemoto, Hyogo (JP); Naoyuki Fukushige, Hyogo (JP)

(73) Assignee: MITSUBISHI HEAVY INDUSTRIES MACHINERY SYSTEMS, LTD., Kobe (JP)

( * ) Notice: Subject to any disclaimer, the term of this patent is extended or adjusted under 35 U.S.C. 154(b) by 712 days.

(21) Appl. No.: 18/012,868

(22) PCT Filed: Jun. 14, 2021

(86) PCT No.: PCT/JP2021/022501

§ 371 (c)(1),
(2) Date: Dec. 23, 2022

(87) PCT Pub. No.: WO2022/014233

PCT Pub. Date: Jan. 20, 2022

(65) Prior Publication Data

US 2023/0245297 A1 Aug. 3, 2023

(30) Foreign Application Priority Data

Jul. 15, 2020 (JP) ................................ 2020-121052

(51) Int. Cl.
*G06T 7/00* (2017.01)
*B31F 1/28* (2006.01)

(52) U.S. Cl.
CPC ............ *G06T 7/001* (2013.01); *B31F 1/2831* (2013.01); *G06T 2207/10152* (2013.01); *G06T 2207/30124* (2013.01)

(58) Field of Classification Search
CPC ........... G06T 7/001; G06T 2207/10152; G06T 2207/30124; G01N 21/8851; G01N 2021/8917; G01N 21/8914; B31F 1/2831
See application file for complete search history.

(56) References Cited

U.S. PATENT DOCUMENTS

| | | | |
|---|---|---|---|
| 3,630,806 | A | 12/1971 | Kitajima et al. |
| 4,369,905 | A | 1/1983 | Tokuno |

(Continued)

FOREIGN PATENT DOCUMENTS

| | | | |
|---|---|---|---|
| EP | 2101142 | A1 | 9/2009 |
| EP | 3608096 | A1 | 2/2020 |

(Continued)

OTHER PUBLICATIONS

International Search Report and Written Opinion for International Application No. PCT/JP2021/022501 mailed X Aug. 10, 2021; 11pp.

(Continued)

*Primary Examiner* — Abbas Rashid
*Assistant Examiner* — Elisa H Verz
(74) *Attorney, Agent, or Firm* — HAUPTMAN HAM, LLP

(57) ABSTRACT

In a device and a method for detecting a defect in a corrugated cardboard sheet, a device for eliminating a defect in a corrugated cardboard sheet, and a device for manufacturing a corrugated cardboard sheet, the device for detecting a defect in a corrugated cardboard sheet which detects a defect in a wavy core affixed to a liner is provided with: a lighting device that lights the core; an imaging device that (Continued)

captures an image of a lit part in the core; an image processing device that defines a change degree of a light amount value along a conveyance direction of the corrugated cardboard sheet on the basis of the image captured by the imaging device; and a first determination device that compares the change degree of the light amount value with a previously-set first determination value to determine quality.

8 Claims, 9 Drawing Sheets

(56) References Cited

U.S. PATENT DOCUMENTS

| | | | | |
|---|---|---|---|---|
| 4,737,846 | A | 4/1988 | Tokuno et al. | |
| 4,800,286 | A | 1/1989 | Brears | |
| 5,351,308 | A | 9/1994 | Kaminer et al. | |
| 5,885,340 | A * | 3/1999 | Bailey | D21H 19/822 106/209.1 |
| 8,593,649 | B2 | 11/2013 | Mouri | |
| 11,002,686 | B2 * | 5/2021 | Yamada | G01N 21/892 |
| 2006/0225830 | A1 | 10/2006 | Kohler | |
| 2006/0278342 | A1 | 12/2006 | Baierl et al. | |
| 2008/0317940 | A1 | 12/2008 | Kohler | |
| 2009/0091761 | A1 | 4/2009 | Kraus et al. | |
| 2010/0195115 | A1 | 8/2010 | Mouri | |
| 2018/0099471 | A1 | 4/2018 | Baierl et al. | |
| 2018/0200906 | A1 | 7/2018 | Senoo | |
| 2019/0025227 | A1 | 1/2019 | Yamada et al. | |
| 2019/0049381 | A1 * | 2/2019 | Ritoniemi | B27K 5/02 |
| 2020/0118262 | A1 | 4/2020 | Takemoto et al. | |

FOREIGN PATENT DOCUMENTS

| | | | |
|---|---|---|---|
| JP | S62279931 | A | 12/1987 |
| JP | S63105009 | U | 7/1988 |
| JP | H05509136 | A | 12/1993 |
| JP | H06238782 | A | 8/1994 |
| JP | 2017035755 | A | 2/2017 |
| JP | 2017133998 | A | 8/2017 |
| JP | 6227024 | B2 | 11/2017 |
| JP | 2018192632 | A | 12/2018 |
| JP | 2018192633 | A | 12/2018 |
| WO | 2005087460 | A1 | 9/2005 |
| WO | 2009075025 | A1 | 6/2009 |
| WO | 2017017399 | A1 | 2/2017 |

OTHER PUBLICATIONS

Extended European Search Report of European Application No. 21842707.8 mailed Nov. 27, 2023; 8pp.

European Patent Office, Extended European Search Report for European Application No. 16888215.7 dated Dec. 3, 2018; 6 pp.

International Search Report and Written Opinion for International Application No. PCT/JP2016/089080 mailed Mar. 28, 2017; 12pp.

* cited by examiner

DEVICE AND METHOD FOR DETECTING DEFECT IN CORRUGATED CARDBOARD SHEET, DEVICE FOR ELIMINATING DEFECT IN CORRUGATED CARDBOARD SHEET, AND DEVICE FOR MANUFACTURING CORRUGATED CARDBOARD SHEET

RELATED APPLICATIONS

The present application is a National Phase of International Application Number PCT/JP2021/022501, filed Jun. 14, 2021, and claims priority of Japanese Application Number 2020-121052 filed Jul. 15, 2020.

TECHNICAL FIELD

The present disclosure relates to a cardboard sheet defect detection device and method for detecting a defect in a cardboard sheet in which a bottom liner, a corrugated core, and a top liner are bonded together, a cardboard sheet defect removal device including a cardboard sheet defect detection device, and a cardboard sheet-manufacturing apparatus including a cardboard sheet defect removal device.

BACKGROUND ART

A corrugating machine as a cardboard sheet-manufacturing apparatus includes a single facer and a double facer. The single facer processes a medium into a corrugated shape, and bonds a top liner to form a single-faced cardboard sheet. The double facer bonds a bottom liner to a single-faced cardboard sheet to form a double-faced cardboard sheet. The continuous double-faced cardboard sheet manufactured by the double facer is cut into a predetermined width by a slitter scorer, and is cut into a predetermined length by a cutoff device so that a cardboard sheet is manufactured.

When a corrugated core is bonded to the top liner with the single facer to form the single-faced cardboard sheet, in a case where the corrugated shape of the core is deformed, when the top liner or the bottom liner is bonded to the corrugated core, a defective portion such as adhesion defect appears. Therefore, a defective cardboard sheet can be detected by detecting deformation of the core in the single-faced cardboard sheet. As the cardboard sheet defect detection device, for example, PTL 1 below discloses a cardboard sheet defect detection device.

CITATION LIST

Patent Literature

[PTL 1] Japanese Patent No. 6227024

SUMMARY OF INVENTION

Technical Problem

Incidentally, in the single facer, the defect in the single-faced cardboard sheets is not limited to the deformation of the corrugated shape in the core. For example, in winter, condensation generated inside the single facer adheres to the core and the core gets wet, or steam for heating the core leaks and the core gets wet. In addition, foreign substances such as dust adhere to the core. Furthermore, wrinkles appear in the core. The single-faced cardboard sheet becomes a defective sheet, when the core gets wet, the foreign substances adhere to the core, or the wrinkles appear. However, the cardboard sheet defect detection device disclosed in PTL 1 is less likely to detect the defects in the single-faced cardboard sheet.

The present disclosure is made to solve the above-described problems, and an object of the present disclosure is to provide a cardboard sheet defect detection device and method, a cardboard sheet defect removal device, and a cardboard sheet-manufacturing apparatus, in which a cardboard sheet defect resulting from damage caused by various factors in a core can be highly accurately detected.

Solution to Problem

According to the present disclosure, in order to achieve the above-described object, there is provided a cardboard sheet defect detection device that detects a defect in a corrugated core bonded to a liner. The cardboard sheet defect detection device includes a lighting device that lights the core, an imaging device that captures an image of a lighting section of the light in the core, an image processing device that defines a change degree of a light amount value along a conveyance direction of a cardboard sheet, based on a captured image captured by the imaging device, and a first determination device that determines quality by comparing the change degree of the light amount value with a preset first determination value.

In addition, according to the present disclosure, there is provided a cardboard sheet defect detection method for detecting a defect in a corrugated core bonded to a liner. The cardboard sheet defect detection method includes a step of lighting the core, a step of capturing an image of a lighting section of the light in the core, a step of defining a change degree of a light amount value along a conveyance direction of a cardboard sheet, based on a captured image, and a step of determining quality by comparing the change degree of the light amount value with a preset first determination value.

In addition, according to the present disclosure, there is provided a cardboard sheet defect removal device including the cardboard sheet defect detection device, and a rejecting device that rejects a double-faced cardboard sheet cut into a predetermined length including a defective portion detected by the cardboard sheet defect detection device.

In addition, according to the present disclosure, there is provided a cardboard sheet-manufacturing apparatus including a single facer that manufactures a single-faced cardboard sheet by bonding a second liner to a corrugated core, a double facer that manufactures a double-faced cardboard sheet by bonding a first liner to the core side in the single-faced cardboard sheet, and the cardboard sheet defect removal device.

Advantageous Effects of Invention

According to the cardboard sheet defect detection device and method, the cardboard sheet defect removal device, and the cardboard sheet-manufacturing apparatus of the present disclosure, a cardboard sheet defect resulting from damage caused by various factors in a core can be highly accurately detected.

DESCRIPTION OF EMBODIMENTS

Hereinafter, a preferred embodiment of the present disclosure will be described in detail with reference to the drawings. The present disclosure is not limited by the embodiment, and in a case where there are a plurality of embodiments, the present disclosure also includes a configuration in which the respective embodiments are combined with each other. In addition, configuration elements in the embodiment include those which can be easily assumed by those skilled in the art, those which are substantially the same, and those which have a so-called equivalent scope.

[Corrugating Machine]

Figure 1:
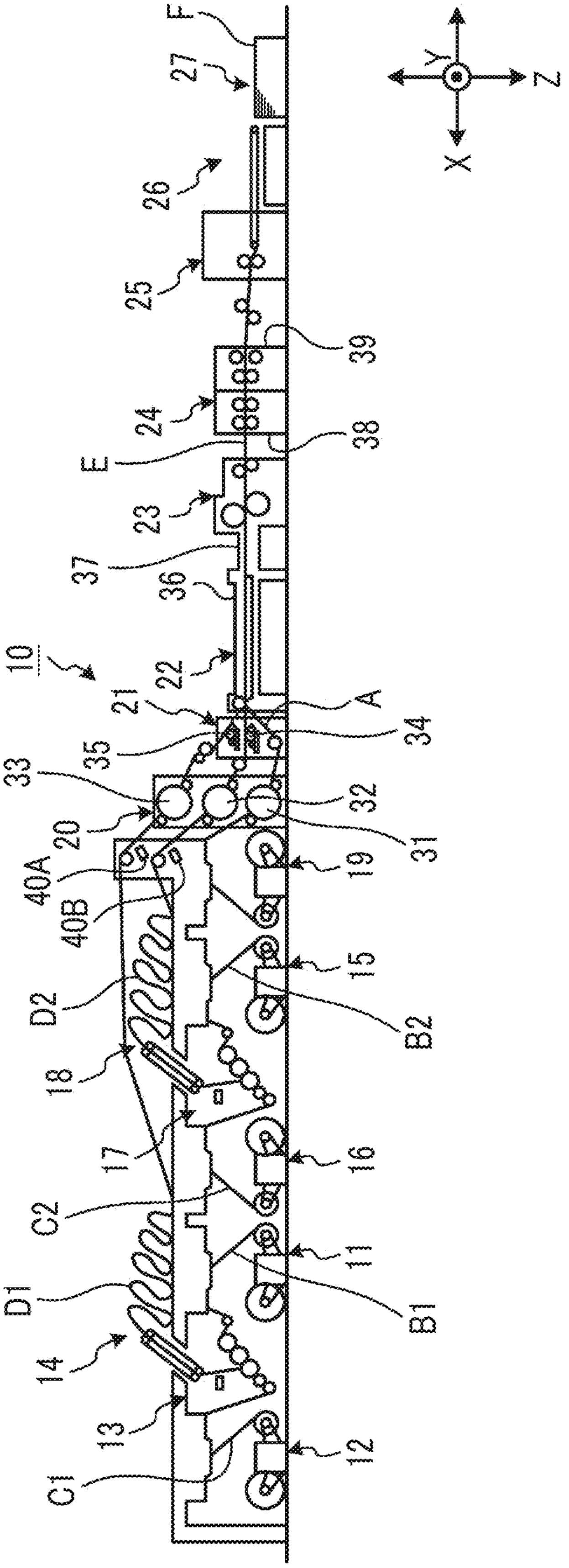
FIG. 1 is a schematic view illustrating a corrugating machine serving as a cardboard sheet-manufacturing apparatus according to the present embodiment.

FIG. 1 is a schematic view illustrating a corrugating machine serving as a cardboard sheet-manufacturing apparatus according to the present embodiment. In the following description, a longitudinal direction of the corrugating machine will be referred to as an X-direction, a horizontal direction orthogonal to the longitudinal direction (X-direction) of the corrugating machine will be referred to as a Y-direction (width direction of a cardboard sheet), and a vertical direction (thickness direction of the cardboard sheet) orthogonal to the longitudinal direction (X-direction) of the corrugating machine will be referred to as a Z-direction.

As illustrated in FIG. 1, first, a corrugating machine 10 serving as the cardboard sheet-manufacturing apparatus bonds a top liner (second liner) C1 to a corrugated core B1 to manufacture a single-faced cardboard sheet D1, and manufactures a single-faced cardboard sheet D2 by bonding a top liner (second liner) C2 to a corrugated core B2. Next, the top liner C2 of the single-faced cardboard sheet D2 is bonded to the core B1 of the manufactured single-faced cardboard sheet D1, and a bottom liner (first liner) A is bonded to the core B2 of the single-faced cardboard sheet D2 to manufacture a continuous double-faced cardboard sheet E. Then, the continuous double-faced cardboard sheet E is cut into a predetermined length to manufacture a double-faced cardboard sheet F having a plate shape. The corrugating machine 10 can also manufacture the double-faced cardboard sheet E by bonding only the single-faced cardboard sheet D1 and the bottom liner A together, or bonding only the single-faced cardboard sheet D2 and the bottom liner A together. Therefore, in the following description, the double-faced cardboard sheet will be referred to as the double-faced cardboard sheet E and the double-faced cardboard sheet F.

The corrugating machine 10 includes a mill roll stand 11 of the core B1, a mill roll stand 12 of the top liner C1, a single facer 13, a bridge 14, and a mill roll stand 15 of the core B2, a mill roll stand 16 of the top liner C2, a single facer 17, a bridge 18, a mill roll stand 19 of the bottom liner A, a preheater 20, a glue machine 21, a double facer 22, a rotary shear 23, a slitter scorer 24, a cutoff 25, a defective sheet rejecting device 26, and a stacker 27.

Roll sheets in which the cores B1 and B2 are respectively wound in a roll shape around both sides in the X-direction are mounted on the mill roll stands 11 and 15, and a splicer for splicing the roll sheet is provided between the respective roll sheets. When the roll sheet is fed from one roll sheet, the other roll sheet is mounted thereon, and the splicing is prepared. When one roll sheet is left a little, the splicer splices the other roll sheet subsequently to the one roll sheet. Therefore, the cores B1 and B2 are continuously fed toward a downstream side from the respective mill roll stands 11 and 15.

Roll sheets in which the top liners C1 and C2 are respectively wound in a roll shape around both sides in the X-direction are mounted on the mill roll stands 12 and 16, and a splicer for splicing the roll sheet is provided between the respective roll sheets. When the roll sheet is fed from one roll sheet, the other roll sheet is mounted thereon, and the splicing is prepared. When one roll sheet is left a little, the splicer splices the other roll sheet subsequently to the one roll sheet. Therefore, the top liners C1 and C2 are continuously fed toward the downstream side from the respective mill roll stands 12 and 16.

The cores B1 and B2 fed from the mill roll stands 11 and 15 and the top liners C1 and C2 fed from the mill roll stands 12 and 16 are respectively preheated by preheaters (not illustrated). The respective preheaters have a heating roll into which steam is supplied, and the cores B1 and B2 and the top liners C1 and C2 are conveyed by being wound around the heating roll so that all of these are heated up to a predetermined temperature.

The single facer 13 processes the heated core B1 into a corrugated shape, and thereafter, the core B1 is glued to each flute tip portion. The heated top liner C1 is bonded thereto to form the single-faced cardboard sheet D1. The single facer 13 is provided with a pick-up conveyor in an outlet portion of the single-faced cardboard sheet D1, and conveys the single-faced cardboard sheet D1 formed by the single facer 13 to the bridge 14. In order to absorb a speed difference between the single facer 13 and the double facer 22, the bridge 14 temporarily retains the single-faced cardboard sheet D1.

The single facer 17 processes the heated core B2 into a corrugated shape, and thereafter, the core B2 is glued to each flute tip portion. The heated top liner C2 is bonded thereto to form the single-faced cardboard sheet D2. The single facer 17 is provided with a pick-up conveyor in an outlet portion of the single-faced cardboard sheet D2, and conveys the single-faced cardboard sheet D2 formed by the single facer 17 to the bridge 18. In order to absorb a speed difference between the single facer 17 and the double facer 22, the bridge 18 temporarily retains the single-faced cardboard sheet D2.

Roll sheets in which the bottom liners A are respectively wound in a roll shape around both sides are mounted on the mill roll stand 19, and a splicer for splicing the roll sheet is provided between the respective roll sheets. When the roll sheet is fed from one roll sheet, the other roll sheet is mounted thereon, and the splicing is prepared. When one roll sheet is left a little, the splicer splices the other roll sheet subsequently to the one roll sheet. Therefore, the bottom liner A is continuously fed toward the downstream side from the mill roll stand 19.

In the preheater 20, three preheat rolls 31, 32, and 33 are aligned in the Z-direction. The preheat roll 31 heats the bottom liner A, the preheat roll 32 heats the single-faced cardboard sheet D2, and the preheat roll 33 heats the single-faced cardboard sheet D1. The respective preheat rolls 31, 32, and 33 have a winding amount adjustment device (not illustrated), and steam is internally supplied thereto to be heated up to a predetermined temperature. The bottom liner A, the single-faced cardboard sheet D2, and the single-faced cardboard sheet D1 are wound around a peripheral surface thereof. In this manner, all of these are preheated.

In the glue machine 21, glue rolls 34 and 35 are aligned in the Z-direction. The glue roll 34 comes into contact with and glues each flute tip portion of the core B2 in the single-faced cardboard sheet D2 heated by the preheat roll 32. The glue roll 35 comes into contact with and glues each flute tip portion of the core B1 in the single-faced cardboard sheet D1 heated by the preheat roll 33. The single-faced cardboard sheets D1 and D2 glued by the glue machine 21 are transferred to the double facer 22 for a subsequent step. The bottom liner A heated by the preheat roll 31 is also transferred to the double facer 22 through the inside of the glue machine 21.

The double facer 22 includes an upstream-side heating section 36 and a downstream-side cooling section 37 along each traveling line of the respective single-faced cardboard sheets D1 and D2 and the bottom liner A. The single-faced cardboard sheets D1 and D2 and the bottom liner A which are glued by the glue machine 21 are carried between a pressurizing belt and a heating plate in the heating section 36, and are integrated and transferred toward the cooling section 37 in a state of overlapping each other. During the transfer, the respective single-faced cardboard sheets D1 and D2 and the bottom liner A are heated while being pressed. In this manner, all of these are bonded to each other to form the continuous double-faced cardboard sheet E. Thereafter, all of these are naturally cooled while being conveyed.

The double-faced cardboard sheet E manufactured by the double facer 22 is transferred to the slitter scorer 24. The slitter scorer 24 cuts the wide double-faced cardboard sheet E along the X-direction to have a predetermined width, and processes a creasing line extending in the X-direction. The slitter scorer 24 is configured to include a first slitter scorer unit 38 and a second slitter scorer unit 39 which have substantially the same structure arrayed along the X-direction of the double-faced cardboard sheet E. The wide double-faced cardboard sheet E is cut by the slitter scorer 24 to form the double-faced cardboard sheet E having a predetermined width.

The cutoff 25 cuts the double-faced cardboard sheet E cut in the X-direction by the slitter scorer 24 along the Y-direction, and forms the plate-shaped double-faced cardboard sheet F having a predetermined length. The defective sheet rejecting device 26 rejects the double-faced cardboard sheet F determined as a defective sheet by a defect detection device (to be described later) from a conveyance line. Although not illustrated, the defective sheet rejecting device 26 includes a rejecting conveyor and a sorting roll. When the plate-shaped double-faced cardboard sheet F determined as the defective sheet is conveyed, the sorting roll descends to sort and reject the plate-shaped double-faced cardboard sheet F of the defective sheet to the rejecting conveyor. The stacker 27 stacks the double-faced cardboard sheets F determined as quality sheets, and rejects the double-faced cardboard sheets F out of the apparatus, as products.

[Cardboard Sheet Defect Detection Device]

Figure 2:
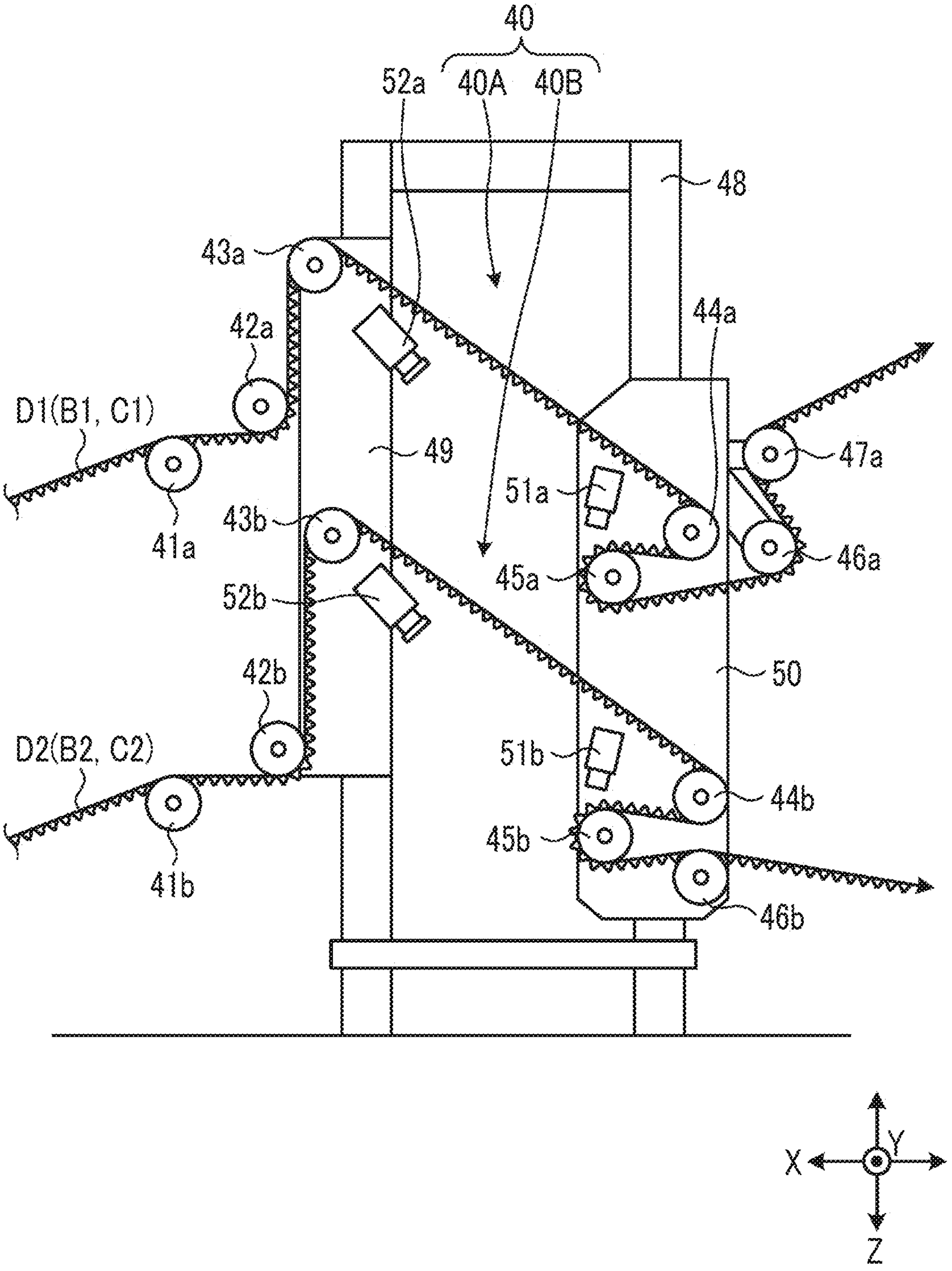
FIG. 2 is a schematic view illustrating a mounting state of a cardboard sheet defect detection device according to the present embodiment.

Here, a cardboard sheet defect detection device according to the present embodiment will be described. FIG. 2 is a schematic view illustrating a mounting state of the cardboard sheet defect detection device of the present embodiment, and FIG. 3 is a schematic configuration diagram illustrating the cardboard sheet defect detection device.

As illustrated in FIG. 2, a cardboard sheet defect detection device 40 is provided between the bridge 18 and the preheater 20. The cardboard sheet defect detection device 40 includes a first defect detection device 40A and a second defect detection device 40B. The first defect detection device 40A detects defects in the single-faced cardboard sheet D1 (B1, C1). The second defect detection device 40B detects defects in the single-faced cardboard sheet D2 (B2, C2). The first defect detection device 40A and the second defect detection device 40B have substantially the same configuration. The single-faced cardboard sheet D1 conveyed from the bridge 14 side is guided by guide rollers 41*a*, 42*a*, and 43*a* to reach the first defect detection device 40A, and is guided and conveyed to the preheater 20 side by guide rollers 44*a*, 45*a*, 46*a*, and 47*a*. The single-faced cardboard sheet D2 conveyed from the bridge 18 side is guided by guide rollers 41*b*, 42*b*, and 43*b* to reach the second defect detection device 40B, and is guided and conveyed to the preheater 20 side by guide rollers 44*b*, 45*b*, and 46*b*.

Support plates 49 and 50 are fixed to a frame 48. The guide rollers 43*a* and 43*b* are rotatably supported by the support plate 49, and the guide rollers 44*a*, 44*b*, 45*a*, 45*b*, 46*a*, 46*b*, and 47*a* are rotatably supported by the support plate 50. The support plate 49 supports imaging devices 52*a* and 52*b*, and the support plate 50 supports lighting devices 51*a* and 51*b*.

Figure 3:
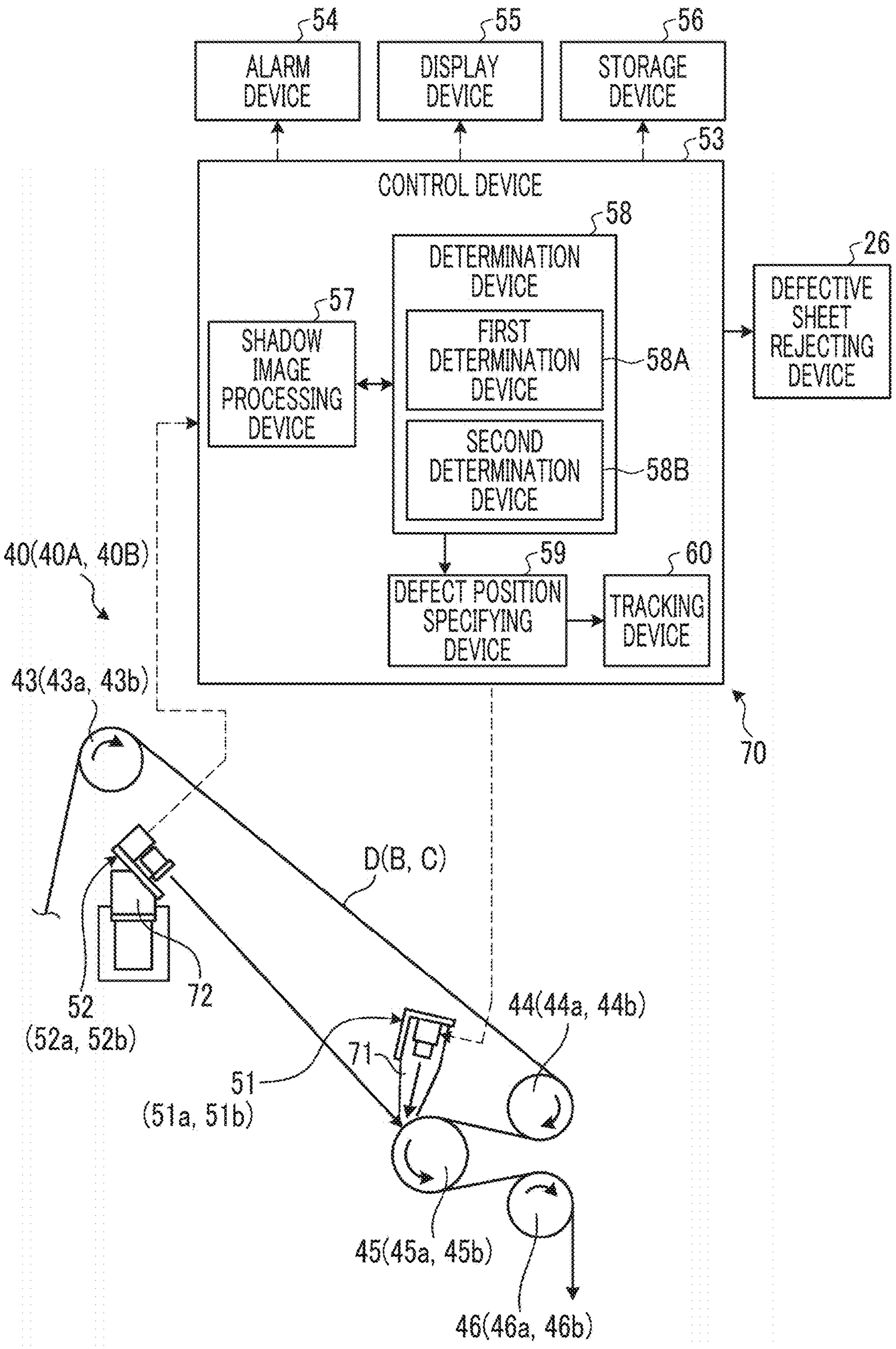
FIG. 3 is a schematic configuration diagram illustrating the cardboard sheet defect detection device.

As illustrated in FIG. 3, the cardboard sheet defect detection device 40 (40A and 40B) detects a defect in the single-faced cardboard sheet D (D1 and D2) conveyed by the guide rollers 43, 44, 45, and 46 outside the corrugated core B. The cardboard sheet defect detection device 40 includes a lighting device 51 (51*a* and 51*b*), an imaging device 52 (52*a* and 52*b*), a control device 53, an alarm device 54, a display device 55, and a storage device 56. The control device 53 includes a shadow image processing device 57 and a determination device 58. Although not illustrated, the control device 53 includes a CPU, a memory, and an I/F. The CPU, the memory, and the I/F are connected to be capable of communicating with each other via a bus. The CPU comprehensively controls an operation of the cardboard sheet defect detection device 40. For example, the CPU controls the operation of the cardboard sheet defect detection device 40 by executing a control program stored in the memory.

The cardboard sheet defect removal device 70 of the present embodiment includes the cardboard sheet defect detection device 40, the defective sheet rejecting device 26, a defect position specifying device 59 forming the control device 53, and a tracking device 60.

The guide rollers 43, 44, 45, and 46 can rotationally drive the other guide roller or can be rotationally driven by the other guide roller, and can guide and convey the single-faced cardboard sheet D in outer peripheral portions thereof. The single-faced cardboard sheet D is formed by bonding the corrugated core B to the top liner C, and the guide roller 43 guides the single-faced cardboard sheet D outside the corrugated core B.

The lighting device 51 lights the core B by using parallel light at a lighting angle inclined as much as a preset predetermined angle with respect to a perpendicular line of the single-faced cardboard sheet D. The imaging device 52 images a lighting section (shadow) lit by using the parallel light in the core B. The shadow image processing device 57 defines a change degree of a light amount along the conveyance direction of the single-faced cardboard sheet D, based on a captured image captured by the imaging device 52, and defines a bright section and a dark section. The determination device 58 determines quality of the single-faced cardboard sheet D by comparing the change degree of the light amount defined by the shadow image processing device 57, the length of the bright section, and the length of the dark section with each preset determination value.

The alarm device 54 notifies a determination result of the determination device 28. The display device 55 displays the determination result of the determination device 58. The storage device 56 stores the determination value used by the determination device 58.

In addition, the defect position specifying device 59 specifies a defect position in the single-faced cardboard sheet D which is detected by the cardboard sheet defect detection device 40. The tracking device 60 tracks the defect position in the single-faced cardboard sheet D which is specified by the defect position specifying device 29. The control device 53 operates the defective sheet rejecting device 26, based on a tracking result of the tracking device 60.

Figure 4:
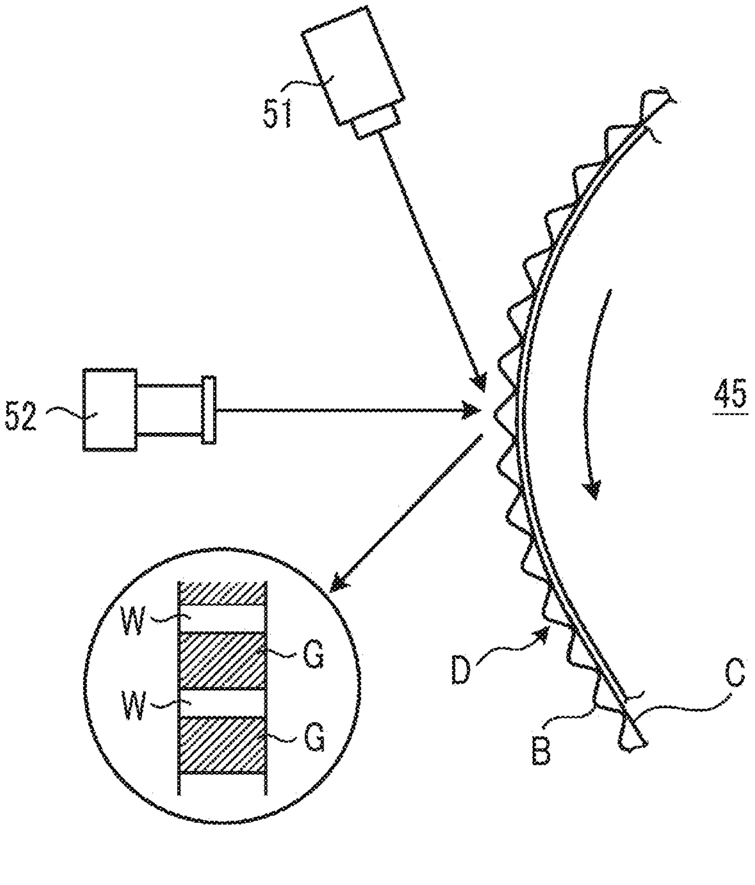
FIG. 4 is a schematic view illustrating a disposition configuration of a lighting device and an imaging device for a single-faced cardboard sheet.
Figure 5:
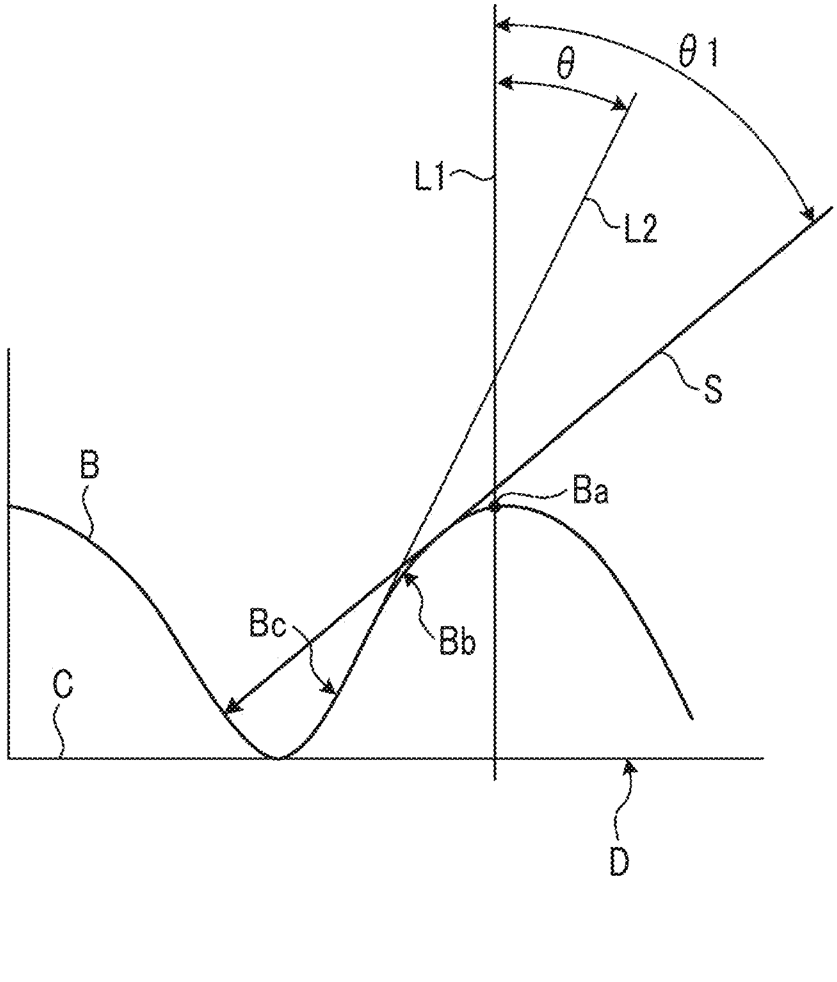
FIG. 5 is a schematic view for describing a lighting angle of the lighting device with respect to a core of the single-faced cardboard sheet.

FIG. 4 is a side view illustrating a disposition configuration of the lighting device and the imaging device for the single-faced cardboard sheet, and FIG. 5 is a schematic view for describing a lighting angle of the lighting device with respect to the core of the single-faced cardboard sheet.

As illustrated in FIGS. 3 and 4, the lighting device 51 is disposed at a position away from the guide roller 45 as much as a predetermined distance, and is fixed to a device main body (support plate 50) by a mounting bracket 71. The lighting device 51 is disposed to face a peripheral surface of the guide roller 45 to correspond to the length of the guide roller 45 in the axial direction. An outer peripheral surface of the guide roller 45, that is, a whole width region of the single-faced cardboard sheet D guided by the guide roller 45 can be lit by using the parallel light. Particularly when the guide roller 45 is viewed in the axial direction, the parallel light travels straight in parallel with each other so that an axis of the light emitted toward the guide roller 45 does not radially spread. The lighting device 51 is configured to include one lighting device or a plurality of lighting devices.

The imaging device 52 is disposed at a position away from the guide roller 45 as much as a predetermined distance, and is fixed to a device main body (support plate 49) by a mounting bracket 72. The imaging device 52 is disposed to face an intermediate position in the axial direction of the guide roller 45, and can image the outer peripheral surface of the guide roller 45, that is, the whole width region of the single-faced cardboard sheet D guided by the guide roller 45. The imaging device 52 is one line camera or a plurality of line cameras, and images the lighting section in the tip of the corrugated core B. In this case, the imaging device 52 can acquire an image having one pixel along the conveyance direction of the single-faced cardboard sheet D and a plurality of pixels along the width direction of the single-faced cardboard sheet D. Therefore, in the imaging device 52, an imaging interval is set in accordance with a conveyance speed of the single-faced cardboard sheet D or a pitch of the tips of the core B.

The imaging device (line camera) 52 is disposed on a perpendicular line of the single-faced cardboard sheet D, that is, a line extending along the radial direction passing through the center of the guide roller 45. However, the lighting device 51 is disposed on a line of an angle (lighting angle) inclined as much as a predetermined angle with respect to the perpendicular line (line extending along the radial direction passing through the center of the guide roller 45) of the single-faced cardboard sheet D.

As illustrated in FIG. 5, in the single-faced cardboard sheet D, the corrugated core B is bonded to the top liner C. The top liner C comes into contact with the guide roller 43, and the core B is conveyed by being exposed outward. The single-faced cardboard sheet D travels in an arc shape while being supported by the guide roller 45. Here, description will be made on the assumption that the single-faced cardboard sheet D linearly travels. A perpendicular line L1 of the single-faced cardboard sheet D along the radial direction passing through the center of the guide roller 45 and an apex portion Ba of the tip of the core B is defined. A lighting angle θ1 of parallel light S emitted by the lighting device 51 represents an angle with respect to the perpendicular line L1, and is set to the angle θ1 which is larger than an angle θ formed from the perpendicular line L1 to an inclined line L2 along an inclined surface of the tip of the core B. The tip of the core B includes a first curve portion Bb having a shape protruding outward from an apex portion Ba of the tip to a foot portion and a second curve portion Bc having a shape recessed outward. The inclined line L2 is a tangential line with respect to a position on the most foot side in the first curve portion Bb. The lighting angle θ1 of the parallel light S emitted by the lighting device 51 is set to the angle θ1 which is larger than the angle θ formed from the perpendicular line L1 to the inclined line L2. Accordingly, the light can generate the shadow of the tip.

As illustrated in FIG. 4, the lighting device 51 lights the core B by using the parallel light at the predetermined lighting angle θ1, and the imaging device 52 images the lighting section in the tip of the core B. Therefore, a boundary line is clearly formed between a bright section W and a dark section G, and thus, the length of the bright section W and the length of the dark section G can be highly accurately defined.

As illustrated in FIG. 3, the shadow image processing device 57 defines the change degree of the light amount, based on the shadow of each tip of the core B from the captured image of the imaging device 52. In this case, the imaging device (line camera) 52 acquires the image of the shadow of one tip in the corrugated core B, as the image having one pixel along the conveyance direction of the single-faced cardboard sheet D and the plurality of pixels along the width direction of the single-faced cardboard sheet D. Therefore, the shadow image processing device 57 combines a plurality of images having 1-pixel×the plurality of pixels with each other along the conveyance direction of the single-faced cardboard sheet D, thereby defining a plurality of continuous light amount values in a predetermined length of the single-faced cardboard sheet D.

In addition, the shadow image processing device 57 defines the bright section W and the dark section G, based on the shadow of each tip of the core B from the captured image of the imaging device 52. The shadow image processing device 57 combines a plurality of images having 1-pixel×the plurality of pixels of the imaging device (line camera) 52 with each other along the conveyance direction of the single-faced cardboard sheet D, thereby defining a plurality of continuous bright sections W and dark sections G in a predetermined length of the single-faced cardboard sheet D.

In this case, on the image of the bright section W or the dark section G as much as a predetermined length of the single-faced cardboard sheet D, the shadow image processing device 57 defines the bright section W or the dark section G by adding all imaging data of the bright section W or the dark section G in the width direction of the single-faced cardboard sheet D. On the image of the bright section W or the dark section G as much as the predetermined length of the single-faced cardboard sheet D, the shadow image processing device 57 may define the bright section W or the dark section G by adding only some of the imaging data of the bright section W or the dark section G in the width direction of the single-faced cardboard sheet D.

The determination device 58 includes a first determination device 58A and a second determination device 58B. The first determination device 58A determines quality of the single-faced cardboard sheet D, based on the change degree of the light amount defined by the shadow image processing device 57. The second determination device 58B determines quality of the single-faced cardboard sheet D, based on the bright section W and the dark section G which are defined by the shadow image processing device 57. In this case, the first determination device 58A and the second determination device 58B concurrently perform defect determination processing for the single-faced cardboard sheet D.

The first determination device 58A determines the quality by comparing the change degree of the light amount defined by the shadow image processing device 57 with a preset first determination value. The imaging device 52 images the shadow of each tip of the core B by using the light. Accordingly, the change degree of the light amount is changed in the conveyance direction of the single-faced cardboard sheet D. That is, the change degree increases in the above-described bright section W, and decreases in the above-described dark section G. The first determination device 58A defines a light amount value when the increasing light amount value decreases, as a great light amount value, and defines a light amount value when the decreasing light amount value increases, as a small light amount value. The first determination device 58A determines the quality of the single-faced cardboard sheet D by comparing at least one of the great light amount value and the small light amount value with the first determination value.

In this case, the first determination device 58A determines the quality of the single-faced cardboard sheet D by comparing the great light amount value and a maximum value determination value (first determination value) with each other, and determines the quality of the single-faced cardboard sheet D by comparing the small light amount value and a minimum value determination value (first determination value) with each other. That is, when the single-faced cardboard sheet D is conveyed, the great light amount value and the small light amount value are alternately and continuously defined. The first determination device 58A continuously determines the quality of the great light amount value and the quality of the small light amount value. Only one of the quality of the great light amount value and the quality of the small light amount value may be determined.

Here, when the lighting angle θ1 of the parallel light S in the lighting device 51 is set to a predetermined angle, a maximum reference value and a minimum reference value of the light amount are set in advance through an experiment in accordance with the shape of the tip of the core B in the single-faced cardboard sheet D. Then, a predetermined margin is subtracted from the maximum reference value to set a lower limit value of a maximum determination region, and a predetermined margin is added to the maximum reference value to set an upper limit value of the maximum determination region. Similarly, a predetermined margin is subtracted from the minimum reference value to set a lower limit value of a minimum determination region, and a predetermined margin is added to the minimum reference value to set an upper limit value of the minimum determination region. When the great light amount value processed and obtained by the shadow image processing device 57 falls within the maximum determination region, the first determination device 58A determines that the single-faced cardboard sheet D is the quality sheet. When the great light amount value does not fall within the maximum determination region, the first determination device 58A determines that the single-faced cardboard sheet D is the defective sheet. In addition, when the small light amount value processed and obtained by the shadow image processing device 57 falls within the minimum determination region, the first determination device 58A determines that the single-faced cardboard sheet D is the quality sheet. When the small light amount value does not fall within the minimum determination region, the first determination device 58A determines that the single-faced cardboard sheet D is the defective sheet.

Figure 6:
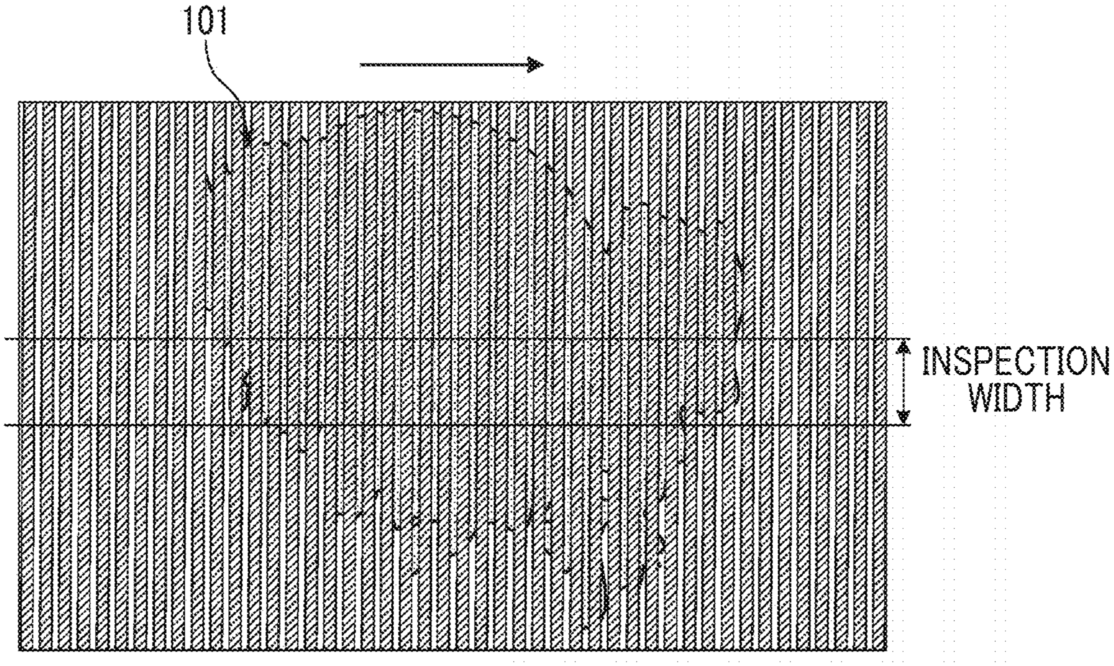
FIG. 6 is a schematic view illustrating a shadow image in a state of a wetting defect in the core.
Figure 7:
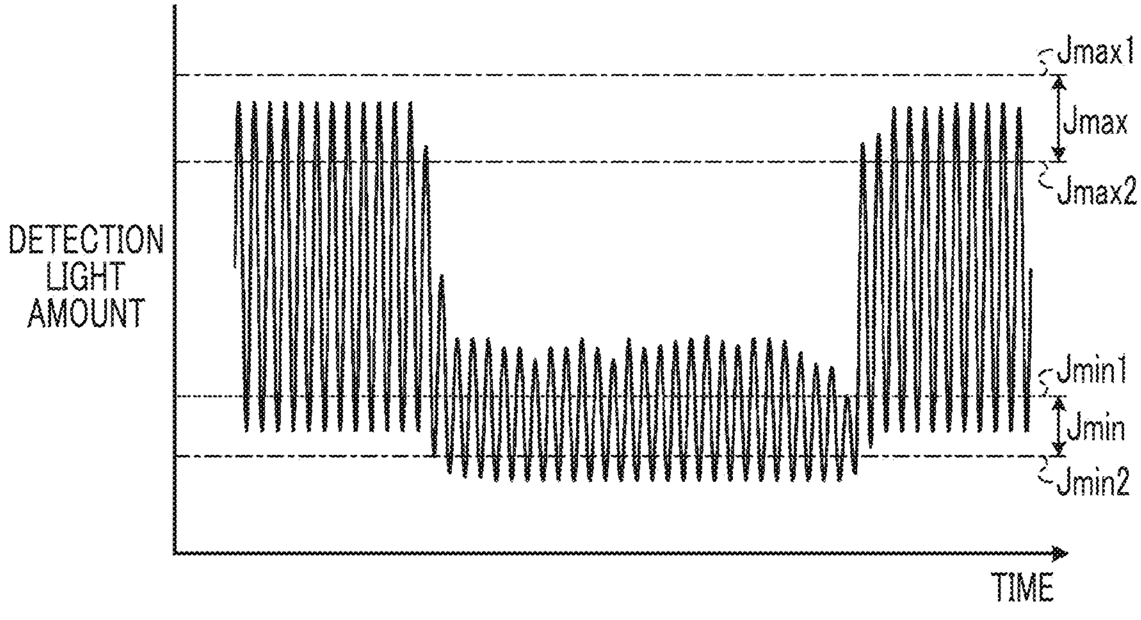
FIG. 7 is a graph illustrating a detection light amount in a shadow image in a state of the wetting defect in the core.

FIG. 6 is a schematic view illustrating a shadow image in a state of a wetting defect in the core, and FIG. 7 is a graph illustrating a detection light amount in the shadow image in the state of the wetting defect in the core. That is, FIG. 6 is the shadow image of the corrugated core B imaged by the imaging device 52, and FIG. 7 illustrates a change degree of the light amount in a predetermined inspection width in the shadow image processed by the shadow image processing device 57.

As illustrated in FIG. 6, a rightward-leftward direction is the conveyance direction of the single-faced cardboard sheet D, and a defective portion 101 partially exists due to wetting. The defective portion 101 is blackened due to the wetting, and the amount of reflected light decreases. In addition, the predetermined inspection width is set. As illustrated in FIG. 7, the change degree of the light amount is changed in the conveyance direction of the single-faced cardboard sheet D. The light amount increases in the bright section W, and decreases in the dark section G. When the light amount increases and decreases at a predetermined light amount, a maximum peak value in this case is defined as the great light amount value. On the other hand, when the light amount decreases and increases at a predetermined light amount, a minimum peak value in this case is defined as the small light amount value. Here, in the defective portion 101 formed due to the wetting, the amount of reflected light decreases. Accordingly, the great light amount value and the small light amount value decrease.

Then, as described above, a predetermined margin is subtracted from the maximum reference value to set a lower limit value Jmax2 of a maximum determination region Jmax, and a predetermined margin is added to the maximum reference value to set an upper limit value Jmax1 of a maximum determination region Jmax. Similarly, a predetermined margin is subtracted from the minimum reference value to set a lower limit value Jmin2 of a minimum determination region Jmin, and a predetermined margin is added to the minimum reference value to set an upper limit value Jmin1 of a minimum determination region Jmin. The first determination device 58A determines that the single-faced cardboard sheet D is the defective sheet, when the great light amount value does not fall within the maximum determination region Jmax. In addition, the first determination device 58A determines that the single-faced cardboard sheet D is the defective sheet, when the small light amount value does not fall within the minimum determination region Jmin. That is, the first determination device 58A determines that a portion where the great light amount value and the small light amount value are not respectively within the maximum determination region Jmax and the minimum determination region Jmin is a defective portion in the single-faced cardboard sheet D.

In the above description, the defective portion 101 caused by the wetting is blackened, and the amount of reflected light decreases. Therefore, the great light amount value and the small light amount value greatly decrease, compared to the lower limit value Jmax2 of the maximum determination region Jmax and the lower limit value Jmin2 of the minimum determination region Jmin. Therefore, the first determination device 58A determines that there is a defective portion due to the wetting, when a difference between the great light amount value and the lower limit value Jmax2 of the maximum determination region Jmax is greater than a preset maximum value determination difference. In addition, the first determines that there is a defective portion caused by the wetting, when a difference between the small light amount value and the lower limit value Jmin2 of the minimum determination region Jmin is greater than a preset minimum value determination difference.

In addition, the defect in the core B in the single-faced cardboard sheet D is not only due to the wetting. For example, the core B may be wrinkled and defective. The defective portion caused by wrinkles is slightly blackened, and the amount of reflected light slightly decreases. Therefore, the great light amount value and the small light amount value decrease to be smaller than the lower limit value Jmax2 of the maximum determination region Jmax and the lower limit value Jmin2 of the minimum determination region Jmin. Therefore, the first determination device 58A determines that there is a defective portion caused by the wrinkles, when a difference between the great light amount value and the lower limit value Jmax2 of the maximum determination region Jmax is smaller than a preset maximum value determination difference. In addition, the first determination device 58A determines that there is a defective portion caused by the wrinkles when the difference between the small light amount value and the lower limit value Jmin2 of the minimum determination region Jmin is smaller than a preset minimum value determination difference.

Furthermore, foreign substances may adhere to the core B, thereby resulting in a defect. The amount of reflected light increases or decreases in the defective portion caused by adhesion of the foreign substances. Therefore, the first determination device 58A determines that there is the defective portion caused by adhesion of the foreign substances, according to the difference between the great light amount value and the maximum determination region Jmax or the difference between the small light amount value and the minimum determination region Jmin.

The maximum determination region Jmax and the minimum determination region Jmin are not limited to those set by using the above-described method. For example, the maximum value determination value and the minimum value determination value may be values calculated by averaging a plurality of the great light amount values and a plurality of the small light amount values which are previously determined as the quality sheets, that is, so-called movement average values.

In addition, the maximum determination region Jmax and the minimum determination region Jmin are set for each type (type of the core B) of the single-faced cardboard sheet D, and are stored in the storage device 56. Particularly when shapes or materials of the core B in the single-faced cardboard sheets D are different, the amounts of reflected light are different. Accordingly, the great light amount values and the small light amount values are different. Therefore, a plurality of types of the maximum determination region Jmax and the minimum determination region Jmin are set according to the type of core B.

The second determination device 58B determines the quality of the single-faced cardboard sheet D by comparing the length of the bright section W and the length of the dark section G which are defined by the shadow image processing device 57 with a second determination value. In this case, the second determination device 58B determines the quality by comparing the length of the bright section W and a bright section determination value (second determination value), and determines the quality by comparing the length of the dark section G with a dark section determination value (second determination value). That is, when the single-faced cardboard sheet D is conveyed, the bright sections W and the dark sections G are alternately and continuously defined. The second determination device 58B continuously determines the quality of the bright section W and the quality of the dark section G. Only one of the quality of the length of the bright section W and the quality of the length of the dark section G may be determined.

Here, in the bright section determination value and the dark section determination value, when the lighting angle θ1 of the parallel light S in the lighting device 51 is set to a predetermined angle, a bright section reference value and a dark section reference value are set in advance through an experiment in accordance with a shape of the tip of the core B in the single-faced cardboard sheet D. Then, a predetermined margin is subtracted from the bright section reference value to set the lower limit value of the bright section determination region, and a predetermined margin is added to the bright section reference value to set the bright section determination region. Similarly, a predetermined margin is subtracted from the dark section reference value to set the lower limit value of the dark section determination region, and a predetermined margin is added to the dark section reference value to set the dark section determination region. That is, when the length of the bright section W processed and obtained by the shadow image processing device 57 falls within the bright section determination region, the second determination device 58B determines that the single-faced cardboard sheet D is the quality sheet. When the length of the bright section W does not fall within the bright section determination region, the second determination device 58B determines that the single-faced cardboard sheet D is the defective sheet. In addition, when the length of the dark section G processed and obtained by the shadow image processing device 57 falls within the dark section determination region, the second determination device 58B determines that the single-faced cardboard sheet D is the quality sheet. When the length of the dark section G does not fall within the dark section determination region, the second determination device 58B determines that the single-faced cardboard sheet D is the defective sheet.

The bright section determination value and the dark section determination value are not limited to those set by using the above-described method. For example, the bright section determination value and the dark section determination value may be values calculated by respectively averaging the lengths of the plurality of bright sections W and the lengths of the plurality of dark sections G for which the quality determination is previously completed, that is, so-called movement average values.

The bright section determination value and the dark section determination value are set for each type (type of the core B) of the single-faced cardboard sheet D, and are stored in the storage device 56. Particularly when shapes (heights or pitches) of the core B in the single-faced cardboard sheet D are different, shapes of the shadows are different. Accordingly, the lengths of the bright sections W or the lengths of the dark sections G are different. Therefore, a plurality of types of bright section determination values and dark section determination values are set according to the shape of the core B.

[Cardboard Sheet Defect Detection Method]

Figure 8:
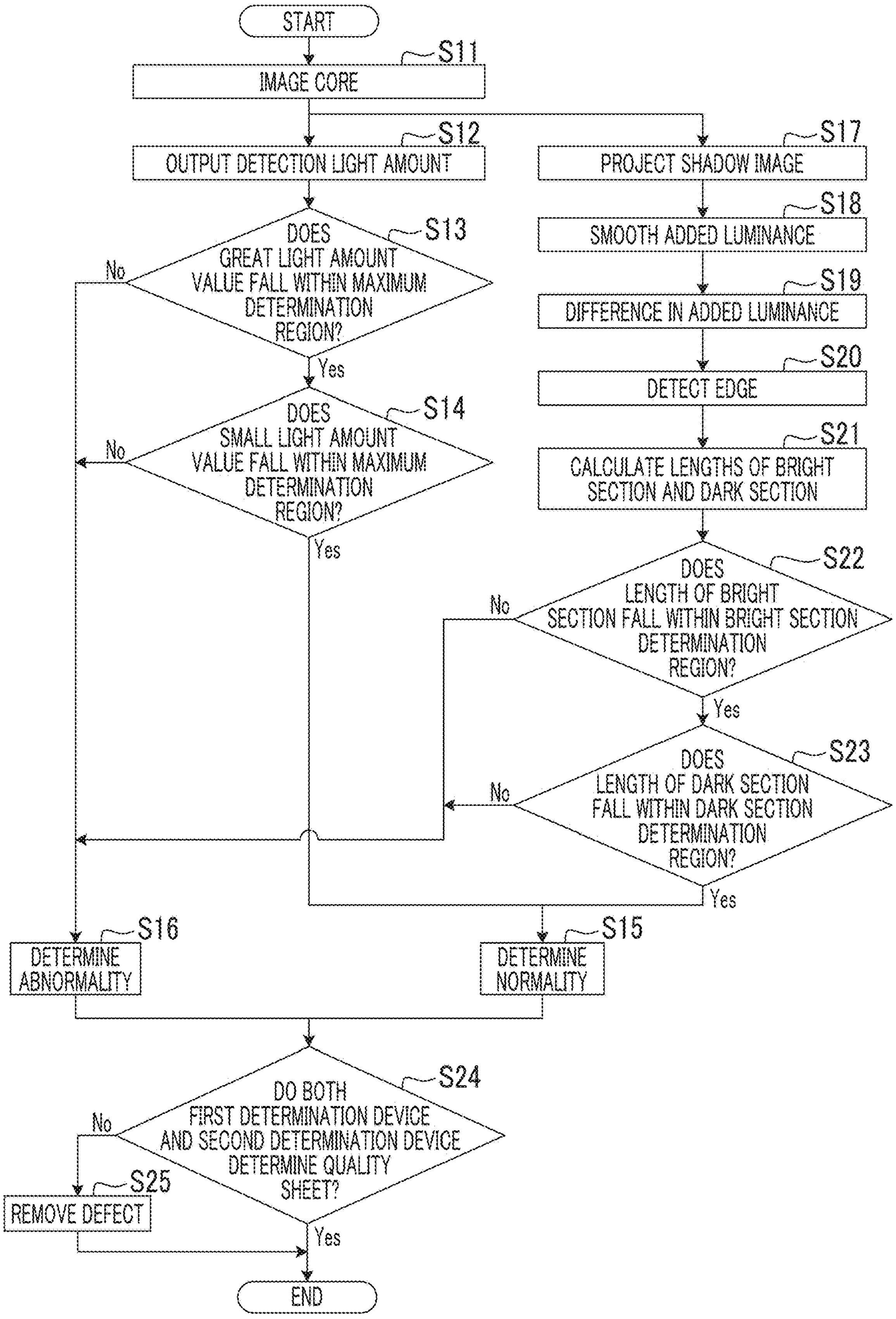
FIG. 8 is a flow chart illustrating a cardboard sheet defect detection method according to the present embodiment.

Hereinafter, a cardboard sheet defect detection method and a cardboard sheet defect removal method will be described in detail. FIG. 8 is a flow chart illustrating the cardboard sheet defect detection method according to the present embodiment.

As illustrated in FIG. 8, the cardboard sheet defect detection method includes a step of lighting the core B, a step of capturing an image of the lighting section of the light in the core B, a step of defining the change degree of the light amount value along the conveyance direction of the single-faced cardboard sheet D, based on the captured image, and a step of determining the quality by comparing the change degree of the light amount value with the preset first determination value.

As illustrated in FIGS. 3 and 8, in the present embodiment, the first determination device 58A and the second determination device 58B concurrently perform the defect determination processing for the single-faced cardboard sheet D. In Step S11, the imaging device 52 images the lighting section of the parallel light in the core B, and acquires the captured image. In Step S12, the shadow image processing device 57 defines the change degree of the light amount, based on the shadow of each tip of the core B from the captured image of the imaging device 52. That is, the shadow image processing device 57 outputs a plurality of continuous detection light amounts in a predetermined length of the single-faced cardboard sheet D.

In Step S13, the first determination device 58A determines whether or not the great light amount value processed and obtained by the shadow image processing device 57 falls within the maximum determination region. Here, when it is determined that the great light amount value falls within the maximum determination region (Yes), the process proceeds to Step S14. On the other hand, when it is determined that the great light amount value does not fall within the maximum determination region (No), an abnormality of the defective core B is determined in Step S16.

In Step S14, the first determination device 58A determines whether or not the small light amount value processed and obtained by the shadow image processing device 57 falls within the minimum determination region. Here, when it is determined that the small light amount value falls within the minimum determination region (Yes), a normality is determined in Step S15. On the other hand, when it is determined that the small light amount value does not fall within the minimum determination region (No), an abnormality of the defective core B is determined in Step S16.

On the other hand, in Step S17, the shadow image processing device 57 projects the shadow image of the core B which is acquired by the imaging device 52. That is, in the shadow image in which the images having one pixel×a plurality of pixels are captured multiple times and aligned in the conveyance direction, the imaging data of the bright section W and the dark section G is added in the width direction of the single-faced cardboard sheet D to calculate added luminance. In Step S18, noise is removed by smoothing the added luminance in the conveyance direction. In Step S19, a difference is obtained by acquiring a difference in the added luminance of the adjacent pixels in the conveyance direction. In Step S20, a difference value increases in an edge of the bright section W and the dark section G. Accordingly, a peak value where the difference value increases is extracted. In Step S21, the length of the bright section W and the length of the dark section G are calculated.

Then, in Step S22, it is determined whether or not the length of the bright section W falls within the bright section determination region. Here, when it is determined that the length of the bright section W falls within the bright section determination region (Yes), the process proceeds to Step S23. On the other hand, in Step S22, when it is determined that the length of the bright section W does not fall within the bright section determination region (No), an abnormality of the defective core B is determined in Step S16.

In Step S23, it is determined whether or not the length of the dark section G falls within the dark section determination region. Here, when it is determined that the length of the dark section G falls within the dark section determination region (Yes), a normality is determined in Step S15. On the other hand, in Step S23, when it is determined that the length of the dark section G does not fall within the dark section determination region (No), an abnormality of the defective core B is determined in Step S16. Then, in Step S24, it is determined whether or not both the first determination device 58A and the second determination device 58B determine the quality sheet. That is, when all of the normal sheets are determined in Steps S13, S14, S22, and S23, the process ends as it is. On the other hand, when at least one abnormality is determined in Steps S13, S14, S22, and S23, in Step S25, the double-faced cardboard sheet F of the defective sheet including the defect is rejected outward from the conveyance line by the defective sheet rejecting device 26.

Figure 9:
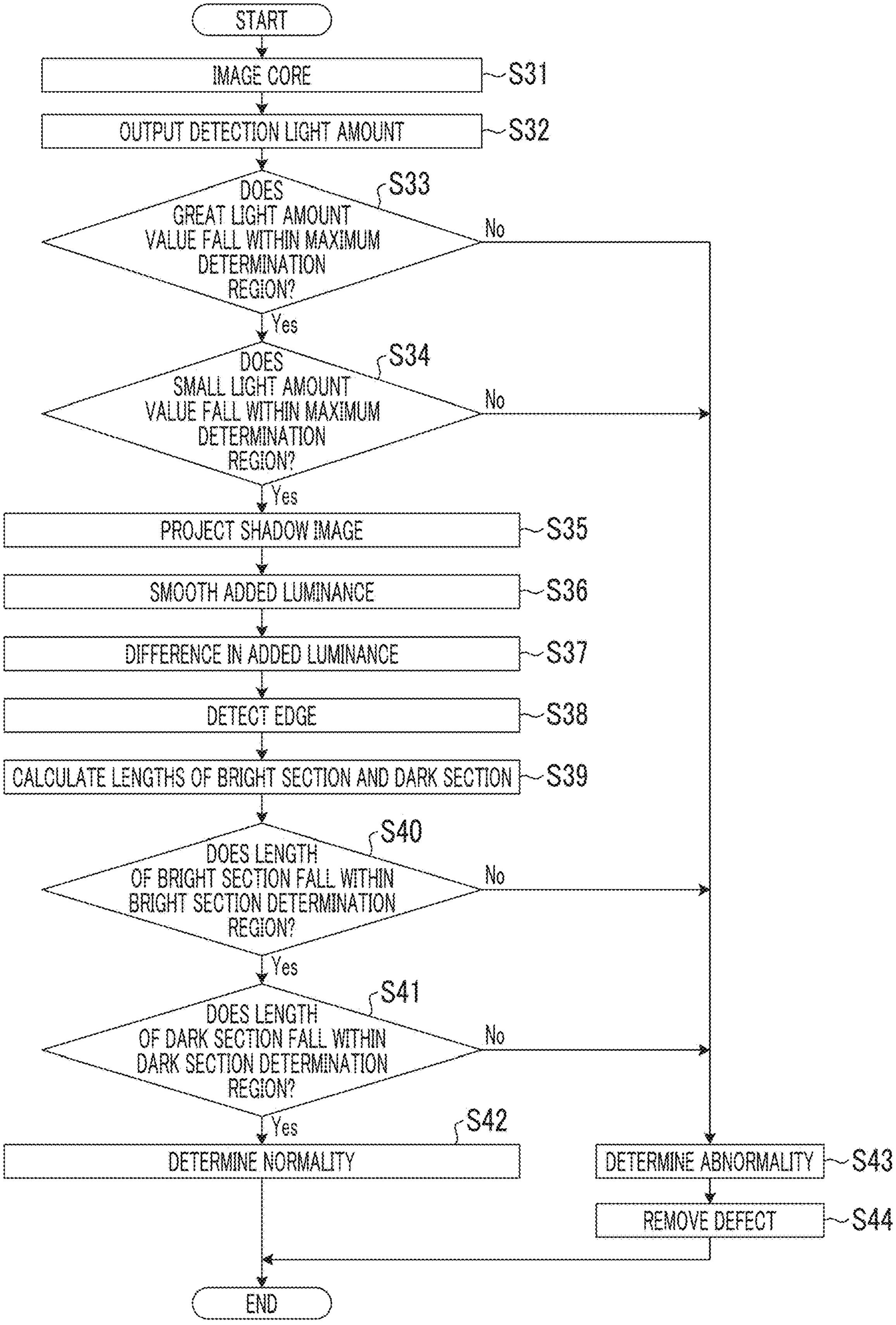
FIG. 9 is a flow chart illustrating a modification example of the cardboard sheet defect detection method according to the present embodiment.

The cardboard sheet defect detection method is not limited to the above-described method. FIG. 9 is a flow chart illustrating a modification example of the cardboard sheet defect detection method of the present embodiment.

As illustrated in FIGS. 3 and 9, in a modification example of the cardboard sheet defect detection method of the present embodiment, when the first determination device 58A determines that the single-faced cardboard sheet D is the defective sheet, the second determination device 58B does not perform determination processing. In Step S31, the imaging device 52 images the lighting section of the parallel light in the core B, and acquires the captured image. In Step S32, the shadow image processing device 57 defines the change degree of the light amount, based on the shadow of each tip of the core B from the captured image of the imaging device 52. That is, the shadow image processing device 57 outputs a plurality of continuous detection light amounts in a predetermined length of the single-faced cardboard sheet D.

In Step S33, the first determination device 58A determines whether or not the great light amount value processed and obtained by the shadow image processing device 57 falls within the maximum determination region. Here, when it is determined that the great light amount value falls within the maximum determination region (Yes), the process proceeds to Step S34. On the other hand, when it is determined that the great light amount value does not fall within the maximum determination region (No), an abnormality of the defective core B is determined in Step S43, and in Step S44, the double-faced cardboard sheet F of the defective sheet including the defect is rejected outward from the conveyance line by the defective sheet rejecting device 26.

In Step S34, the first determination device 58A determines whether or not the small light amount value processed and obtained by the shadow image processing device 57 falls within the minimum determination region. Here, when it is determined that the small light amount value falls within the minimum determination region (Yes), the process proceeds to Step S35. On the other hand, when it is determined that the small light amount value does not fall within the minimum determination region (No), an abnormality of the defective core B is determined in Step S43, and in Step S44, the double-faced cardboard sheet F of the defective sheet including the defect is rejected outward from the conveyance line by the defective sheet rejecting device 26.

In Step S35, the shadow image processing device 57 projects the shadow image of the core B acquired by the imaging device 52. That is, in the shadow image in which the images having one pixel×a plurality of pixels are captured multiple times and aligned in the conveyance direction, the imaging data of the bright section W and the dark section G is added in the width direction of the single-faced cardboard sheet D to calculate added luminance. Then, in Step S36, noise is removed by smoothing the added luminance in the conveyance direction. In Step S37, a difference is obtained by acquiring a difference in the added luminance of the adjacent pixels in the conveyance direction. In Step S38, a difference value increases in an edge of the bright section W and the dark section G. Accordingly, a peak value where the difference value increases is extracted. In Step S39, the length of the bright section W and the length of the dark section G are calculated.

Then, in Step S40, it is determined whether or not the length of the bright section W falls within the bright section determination region. Here, when it is determined that the length of the bright section W falls within the bright section determination region (Yes), the process proceeds to Step S41. On the other hand, when it is determined in Step S40 that the length of the bright section W does not fall within the bright section determination region (No), an abnormality of the defective core B is determined in Step S43, and in Step S44, the double-faced cardboard sheet F of the defective sheet including the defect is rejected outward from the conveyance line by the defective sheet rejecting device 26.

In Step S41, it is determined whether or not the length of the dark section G falls within the dark section determination region. Here, when it is determined that the length of the dark section G falls within the dark section determination region (Yes), the process proceeds to Step S42. On the other hand, when it is determined in Step S41 that the length of the dark section G does not fall within the dark section determination region (No), an abnormality of the defective core B is determined in Step S43, and in Step S44, the double-faced cardboard sheet F of the defective sheet including the defect is rejected outward from the conveyance line by the defective sheet rejecting device 26. When it is determined that the core B is not defective by the determination in Steps S33, S34, S40, and S41, a normality is determined in Step S42.

Figure 10:
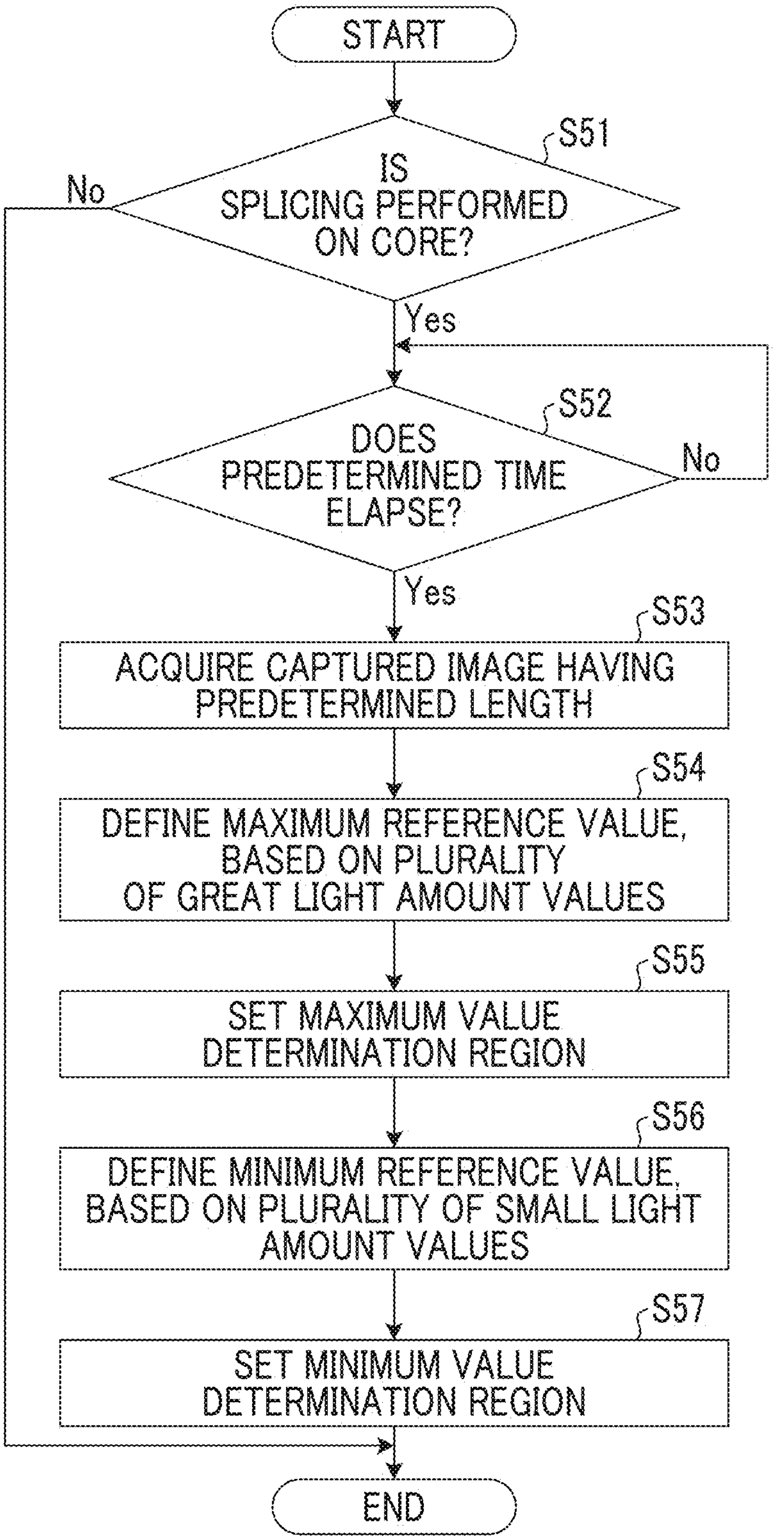
FIG. 10 is a flow chart illustrating a method for setting a determination region.

In the above-described embodiment, the maximum determination region and the minimum determination region which are used for the determination processing of the first determination device 58A are set in advance through an experiment. However, the embodiment is not limited to this configuration. FIG. 10 is a flow chart illustrating a method for setting the determination region.

As illustrated in FIG. 10, in Step S51, it is determined whether or not splicing is performed on the core B. The splicing is performed on the core B by a splicer. When the splicing is performed on the core B, a splicing signal is output from the splicer. Whether or not the splicing is performed on the core B is determined by the presence or absence of the splicing signal. Here, when it is determined that the splicing is not performed on the core B (No), it is assumed that a type of the core B is not changed. Accordingly, this routine is skipped without performing anything. On the other hand, when it is determined that the splicing is performed on the core B (Yes), it is determined in Step S52 whether or not a preset predetermined time elapses after the splicing is performed. Here, when it is determined that the predetermined time does not elapse (No), the first determination device 58A stands by without any change. On the other hand, when it is determined that the predetermined time elapses, the process proceeds to Step S53. When the splicing is performed on the core B, there is a possibility that the type of the core B may be changed. Therefore, it is necessary to change the maximum determination region and the minimum determination region. In addition, after the splicing is performed, the cores B overlap each other as much as a predetermined length. Therefore, the first determination device 58A stands by until an overlapping portion of the cores B passes through the imaging device 52. That is, the predetermined time is a time during which the overlapping portion of the cores B passes through the imaging device 52.

In Step S53, the captured image having a predetermined length (predetermined time) captured by the imaging device 52 is acquired. That is, a predetermined number of the great light amount values and a plurality of the small light amount values are acquired. In Step S54, a maximum light amount value having a largest light amount in the plurality of great light amount values is defined as the maximum reference value. In Step S55, a margin is subtracted from the maximum reference value to set a lower limit value, and a margin is added to the maximum reference value to set an upper limit value. That is, the maximum determination region is set by setting the lower limit value and the upper limit value. In this case, for example, the maximum reference value may be multiplied by a ratio (for example, 80%) as the margin to calculate the lower limit value, and the maximum reference value may be multiplied by a ratio (for example, 110%) as the margin to set the upper limit value.

In Step S56, the minimum light amount value having a smallest light amount in the plurality of small light amount values is defined as the minimum reference value. In Step S57, a margin is subtracted from the minimum reference value to set a lower limit value, and a margin is added to the minimum reference value to set an upper limit value. That is, the minimum determination region is set by setting the lower limit value and the upper limit value. In this case, for example, the minimum reference value may be multiplied by a ratio (for example, 80%) as the margin to calculate the lower limit value, and the minimum reference value may be multiplied by a ratio (for example, 110%) as the margin to set the upper limit value. When the splicing is performed on the core B in this way, there is a possibility that a type of the core B may be changed. Therefore, the maximum determination region and the minimum determination region can be properly set according to the changed type of the core B.

Operational Effect of Present Embodiment

The cardboard sheet defect detection device according to a first aspect includes the lighting device 51 that lights the core B, the imaging device 52 that images the lighting section of the light in the core B, the shadow image processing device 57 that defines the change degree of the light amount value along the conveyance direction of the single-faced cardboard sheet D, based on the image captured by the imaging device 52, and the first determination device 58A that determines the quality by comparing the change degree of the light amount value with the preset first determination value.

In the cardboard sheet defect detection device according to the first aspect, the first determination device 58A determines the quality by comparing the change degree of the light amount value with the first determination value. Therefore, the defects resulting from damage caused by various factors such as wetting, wrinkles, and adhesion of foreign substances in the core B can be detected, and the defect in the single-faced cardboard sheet D can be highly accurately detected.

In the cardboard sheet defect detection device according to a second aspect, the first determination device 58A defines the light amount value when the increasing light amount value decreases, as the great light amount value, defines the light amount value when the decreasing light amount value increases, as the small light amount value, and determines the quality by comparing at least one of the great light amount value and the small light amount value with the first determination value. In this manner, a failure to detect the defect in the core B can be reduced, and accuracy in detecting the quality can be improved.

In the cardboard sheet defect detection device according to a third aspect, the first determination device 58A determines that the cardboard sheet is the defective sheet, when at least one of the great light amount value and the small light amount value does not fall within the first determination region preset as the first determination value. In this manner, since the first determination value is used as the first determination region, accuracy in detecting the quality can be improved.

In the cardboard sheet defect detection device according to a fourth aspect, as the reference value, the first determination device 58A defines the maximum light amount value having the largest light amount in the plurality of great light amount values in the preset predetermined length, sets the lower limit value of the first determination region by subtracting the margin from the reference value, and set the upper limit value of the first determination region by adding the margin to the reference value. In this manner, even when the type of the core B is changed, the optimum first determination region can be set for the polarized core B, and occurrence of erroneous detection of the defect can be suppressed.

In the cardboard sheet defect detection device according to a fifth aspect, as the reference value, the first determination device 58A defines the minimum light amount value having the smallest light amount in the plurality of small light amount values in the preset predetermined length, sets the lower limit value of the first determination region by subtracting the margin from the reference value, and sets the upper limit value of the first determination region by adding the margin to the reference value. In this manner, even when the type of the core B is changed, the optimum first determination region can be set for the polarized core B, and occurrence of erroneous detection of the defect can be suppressed.

In the cardboard sheet defect detection device according to a sixth aspect, the first determination device 58A determines that the cardboard sheet is the defective sheet caused by wetting, when at least one of the difference between the great light amount value and the preset maximum value determination value and the difference between the small light amount value and the preset minimum value determination value is larger than the preset determination difference. In this manner, the defective sheet caused by the wetting can be highly accurately detected, and countermeasures can be taken by specifying the cause of the defective sheet.

In the cardboard sheet defect detection device according to a seventh aspect, the first determination device 58A determines that the cardboard sheet is the defective sheet caused by wrinkles, when at least one of the difference between the great light amount value and the maximum value determination value and the difference between the small light amount value and the minimum value determination value is smaller than the preset determination difference. In this manner, the defective sheet caused by the wrinkles can be highly accurately detected, and countermeasures can be taken by specifying the cause of the defective sheet.

In the cardboard sheet defect detection device according to an eighth aspect, the shadow image processing device 57 includes the second determination device 58B configured to define the bright section W and the dark section G along the conveyance direction of the single-faced cardboard sheet D, based on the image captured by the imaging device 52, and to determine the quality by comparing at least one of the length of the bright section W and the length of the dark section G with the preset second determination value, and determines that the single-faced cardboard sheet D is the defective sheet, when at least one of the first determination device 58A and the second determination device 58B determines that the single-faced cardboard sheet D is the defective sheet. In this manner, the defect in the single-faced cardboard sheet D can be highly accurately determined.

In the cardboard sheet defect detection device according to a ninth aspect, the shadow image processing device 57 includes the second determination device 58B configured to define the bright section W and the dark section G along the conveyance direction of the single-faced cardboard sheet D, based on the image captured by the imaging device 52, and to determine the quality by comparing at least one of the length of the bright section W and the length of the dark section G with the preset second determination value. The second determination device 58B performs determination processing, when the first determination device 58A determines that the single-faced cardboard sheet D is the quality sheet. In this manner, the defect in the single-faced cardboard sheet D can be highly accurately determined. When the first determination device 58A determines that the single-faced cardboard sheet D is the defective sheet, the second determination device 58B does not perform the determination processing. Therefore, wasteful processing performed by the second determination device 58B can be reduced.

The cardboard sheet defect removal method according to a tenth aspect includes a step of lighting the core B, a step of capturing an image of the lighting section of the light in the core B, a step of defining the change degree of the light amount value along the conveyance direction of the single-faced cardboard sheet D, based on the captured image, and a step of determining the quality by comparing the change degree of the light amount value with the preset first determination value. In this manner, the defects resulting from damage caused by various factors such as wetting, wrinkles, and adhesion of foreign substances in the core B can be detected, and the defect in the single-faced cardboard sheet D can be highly accurately detected.

In addition, the cardboard sheet defect removal device according to an eleventh aspect includes the cardboard sheet defect detection device 40, and the defective sheet rejecting device 26 that rejects the double-faced cardboard sheet F cut into the predetermined length including the defective portion detected by the cardboard sheet defect detection device 40. In this manner, the cardboard sheet defect detection device 40 can detect the defects resulting from damage caused by various factors, can highly accurately detect the defect in the single-faced cardboard sheet D, and can properly reject the cardboard sheet including the defective portion.

In addition, the corrugating machine (cardboard sheet-manufacturing apparatus) according to a twelfth aspect includes the single facer 17 that manufactures the single-faced cardboard sheet D by bonding the top liner C to the corrugated core B, the double facer 22 that manufactures the double-faced cardboard sheet E by bonding the bottom liner A to the core B side in the single-faced cardboard sheet D manufactured by the single facer 17, and the cardboard sheet defect removal device 94. In this manner, the cardboard sheet defect detection device 40 can detect the defects resulting from damage caused by various factors, can highly accurately detect the defect in the single-faced cardboard sheet D, and can improve the quality of the double-faced cardboard sheet E.

In the above-described embodiment, the first determination device 58A is configured to determine the defect of the core B by comparing the great light amount value with the maximum value determination value (maximum determination region), and to determine the defect of the core B by comparing the small light amount value with the minimum value determination value (minimum determination region). However, the embodiment is not limited to this configuration. The determination device in the cardboard sheet defect detection device of the present disclosure determines the quality by comparing the change degree of the light amount value with the preset first determination value.

Therefore, for example, when one of the great light amount value and the small light amount value is changed due to the occurrence of the defective portion, a change rate of the great light amount value increases, or a change rate of the small light amount value increases. Therefore, the defect in the core B may be determined by comparing the change rate of the great light amount value and a maximum change rate determination value serving as the first determination value, or the defect in the core B may be determined by comparing the change rate of the small light amount value and a minimum change rate determination value serving as the first determination value. That is, the defect in the core B may be determined according to a change tendency of the great light amount value or the small light amount value.

REFERENCE SIGNS LIST

10: corrugating machine (cardboard sheet-manufacturing apparatus)
11, 12, 15, 16, 19: mill roll stand
13, 17: single facer
14, 18: bridge
20: preheater
21: glue machine
22: double facer
23: rotary shear
24: slitter scorer
25: cutoff
26: defective sheet rejecting device
27: stacker
40: cardboard sheet defect detection device
40A: first defect detection device
40B: second defect detection device
51, 51*a*, 51*b*: lighting device
52, 52*a*, 52*b*: imaging device
53: control device
54: alarm device
55: display device
56: storage device
57: shadow image processing device (image processing device)
58: determination device
58A: first determination device
58B: second determination device
59: defect position specifying device
60: tracking device
70: cardboard sheet defect removal device
A: bottom liner (first liner)
B, B1, B2: core
C, C1, C2: top liner (second liner)
D, D1, D2: single-faced cardboard sheet
E, F: double-faced cardboard sheet
W: bright section
G: dark section

The invention claimed is:

1. A cardboard sheet defect detection device that detects a defect in a corrugated core bonded to a liner, the device comprising:
- a lighting device that lights the core;
- an imaging device that captures an image of a lighting section of the light in the core; and a processor, wherein
- the processor configured to define a bright section and a dark section along the conveyance direction of the cardboard sheet, based on the captured image captured by the imaging device, and to define a change degree of a light amount value along a conveyance direction of a cardboard sheet in the light amount value reflected from the cardboard sheet, based on a captured image captured by the imaging device; and
- determine that the cardboard sheet is a defective sheet by comparing the change degree of a light amount value along a conveyance direction with a first preset determination value,
- the first preset determination value has at least one of a maximum value determination value, which is a light amount value and a minimum value determination value, where the light amount value is lower than the maximum value determination value,
- define in the bright section, a light amount value when an increasing light amount value decreases, as a great light amount value,
- defines in the dark section a light amount value when a decreasing light amount value increases, as a small light amount value, perform at least one of the following comparisons: comparing the great light amount value with the maximum value determination value, or comparing the small light amount value with the minimum value determination value, and determine that the cardboard sheet is a defective sheet when the great light amount value fails to meet a condition of the maximum value determination value, or when the small light amount value fails to meet a condition of the minimum value determination value.

2. The cardboard sheet defect detection device according to claim 1, wherein the first preset determination value is a first determination region that includes an upper limit value and a lower limit value, and the processor is further configured to determine that the cardboard sheet is a defective sheet when the high light intensity value fails to satisfy the first determination region of the maximum value, or when the small light intensity value fails to satisfy the condition of the first determination region of the minimum value determination value.

3. The cardboard sheet defect detection device according to claim 2, wherein as a reference value, the processor is configured to define a maximum light amount value having a largest light amount in the plurality of the great light amount value in a preset predetermined length, sets a lower limit value of the first determination region by subtracting a margin from the reference value, and sets an upper limit value of the first determination region by adding a margin to the reference value.

4. The cardboard sheet defect detection device according to claim 2, wherein as a reference value, the processor is configured to define a minimum light amount value having a smallest light amount in a plurality of the small light amount values in a preset predetermined length, sets a lower limit value of the first determination region by subtracting a margin from the reference value, and sets an upper limit value of the first determination region by adding a margin to the reference value.

5. The cardboard sheet defect detection device according to claim 1, wherein the processor is configured to determine that the cardboard sheet is a defective sheet caused by wetting, when at least one of a difference between the great light amount value and the maximum value determination value and a difference between the small light amount value and the minimum value determination value is larger than a preset determination difference.

6. The cardboard sheet defect detection device according to claim 1, wherein the processor is configured to determine that the cardboard sheet is a defective sheet caused by wrinkles, when at least one of a difference between the great light amount value and the maximum value determination value and a difference between the small light amount value and the minimum value determination value is smaller than the preset determination difference.

7. The cardboard sheet defect detection device according to claim 1, wherein the processor is configured to determine that the cardboard sheet is a defective sheet by comparing at least one of a length of the bright section and a length of the dark section with a preset second determination value, and determines that the cardboard sheet is a defective sheet, when at least one of a determination result obtained by comparing with the preset first determination value and the second preset determination value.

8. The cardboard sheet defect detection device according to claim 1, wherein the processor is configured to;

determine that the cardboard sheet is a defective sheet by comparing at least one of a length of the bright section and a length of the dark section with a preset second determination value, and perform determination processing by comparing with the second preset determination value, when the determination result obtained by comparing with the first preset determination value is a quality sheet.

* * * * *